(12) United States Patent
Su

(10) Patent No.: US 10,654,108 B2
(45) Date of Patent: May 19, 2020

(54) ROTARY CUTTER FOR CUTTING DAMAGED THREADS OF A BOLT

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 0 days.

(21) Appl. No.: 16/185,171

(22) Filed: Nov. 9, 2018

(65) Prior Publication Data

US 2019/0143418 A1 May 16, 2019

(30) Foreign Application Priority Data

Nov. 15, 2017 (TW) .............................. 106139382 A

(51) Int. Cl.
*B23B 5/16* (2006.01)
*B23B 51/10* (2006.01)
*B23G 9/00* (2006.01)

(52) U.S. Cl.
CPC ............ *B23B 5/167* (2013.01); *B23B 51/103* (2013.01); *B23G 9/009* (2013.01); *B23B 2220/08* (2013.01); *Y10T 408/89* (2015.01); *Y10T 408/899* (2015.01)

(58) Field of Classification Search
CPC ......... B23B 5/101; B23B 5/103; B23B 5/167; B23B 2220/08; Y10T 408/89; Y10T 408/893; Y10T 408/899; B23G 9/009
See application file for complete search history.

(56) References Cited

U.S. PATENT DOCUMENTS

| | | | | |
|---|---|---|---|---|
| 2,292,581 A | * | 8/1942 | Richardson ............ | B23G 9/004 408/211 |
| 3,242,526 A | * | 3/1966 | Wilton ..................... | F21V 35/00 408/211 |
| 3,754,832 A | * | 8/1973 | Stickler ................... | B23B 5/167 408/227 |
| 3,875,832 A | * | 4/1975 | Mayfield ................. | B23B 5/162 82/113 |

(Continued)

FOREIGN PATENT DOCUMENTS

| | | | | |
|---|---|---|---|---|
| EP | 2532458 A1 | * | 12/2012 | ............. B23B 5/167 |
| FR | 1256805 A | * | 3/1961 | ............. B23B 5/167 |

*Primary Examiner* — Eric A. Gates
(74) *Attorney, Agent, or Firm* — Alan D. Kamrath; Karin L. Williams; Mayer & Williams PC

(57) ABSTRACT

A rotary cutter for cutting damaged threads of a bolt includes a body rotatable about a rotating axis and having a connecting end and an operative end. A first cutting blade is disposed on an inner periphery of the body facing a cutting space extending along the rotating axis from the operative end towards but spaced from the connecting end. The body further includes a virtual projection plane perpendicular to the rotating axis. A first virtual plane passes through the first cutting blade and extends perpendicularly to the virtual projection plane. A virtual circle and a first virtual reference line are located on the virtual projection plane. The first virtual reference line intersects the rotating axis and passes through an intersection of the first virtual plane and the virtual circle. An angle between the first virtual reference line and the first virtual plane is between 5° and 40°.

16 Claims, 10 Drawing Sheets

(56) References Cited

U.S. PATENT DOCUMENTS

| | | | | |
|---|---|---|---|---|
| 4,205,493 | A * | 6/1980 | Kim | B24D 7/18 |
| | | | | 408/211 |
| 4,798,109 | A * | 1/1989 | Berns | B23B 5/163 |
| | | | | 408/80 |
| 4,798,503 | A * | 1/1989 | Huju | B23B 49/04 |
| | | | | 144/219 |
| 5,961,382 | A * | 10/1999 | Stoloski | B27B 17/0016 |
| | | | | 451/180 |
| 6,164,878 | A | 12/2000 | Satran et al. | |
| 6,234,724 | B1 | 5/2001 | Satran et al. | |
| 9,821,393 | B2 * | 11/2017 | Su | B23G 9/003 |
| 9,937,598 | B2 | 4/2018 | Dode et al. | |
| 10,293,410 | B2 * | 5/2019 | Yu | B23B 5/167 |
| 2016/0082517 | A1 * | 3/2016 | Ferguson | B23B 5/167 |
| | | | | 408/1 BD |
| 2019/0176236 | A1 * | 6/2019 | Su | B23B 5/167 |

* cited by examiner

ROTARY CUTTER FOR CUTTING DAMAGED THREADS OF A BOLT

BACKGROUND OF THE INVENTION

The present invention relates to a rotary cutter and, more particularly, to a rotary cutter for cutting damaged threads of a bolt.

A bolt is generally used to fasten an object, and a nut is mounted around the bolt. A distal end of the bolt could rust, accumulate dirt, or even deform under impact by an alien object, such that the nut cannot be smoothly threaded onto the bolt. A generally approach in this situation is cut the bolt with a screw die to remove rust, dirt, or the damaged portion from the bolt.

When a bolt encounters the above situation, the nut merely gets stuck on the distal end of the bolt, and the remaining portion of the bolt is still useable. In the approach using the screw die, the screw die must be precisely aligned with the threads of the bolt before cutting, so as to assure the cutting route is identical to the original threads of the bolt, which is time-consuming and has low efficiency.

BRIEF SUMMARY OF THE INVENTION

The primary objective of the present invention is to provide a rotary cutter for cutting damaged threads of a bolt. The rotary cutter includes a body rotatable about a rotating axis. The body includes a connecting end and an operative end opposite to the connecting end along the rotating axis. A cutting space extends along the rotating axis from the operative end towards but spaced from the connecting end. The body further includes a first cutting blade disposed on an inner periphery thereof facing the cutting space. The body further includes a virtual projection plane perpendicular to the rotating axis. A first virtual plane passes through the first cutting blade and extends perpendicularly to the virtual projection plane. A virtual circle and a first virtual reference line are located on the virtual projection plane. The virtual circle has a diameter between 1 mm and 20 mm. The first virtual reference line intersects the rotating axis and passes through an intersection of the first virtual plane and the virtual circle. An angle between the first virtual reference line and the first virtual plane and on the virtual projection plane is between 5° and 40°.

In an example, a projection axis is a projection of the rotating axis onto the first virtual plane, and an angle between the first cutting blade and the projection axis is between 25° and 35°.

In an example, the inner periphery of the body facing the cutting space includes a first scrap discharge groove in a radial direction perpendicular to the rotating axis. The first scrap discharge groove corresponds to the first cutting blade, is located on a front side of the first cutting blade, and adjoins the first cutting blade. The first scrap discharge groove includes a first end intercommunicating with the cutting space and a second end extending through the body to an outer periphery of the body. The angle between the first virtual reference line and the first virtual plane and on the virtual projection plane is between 20° and 40°. The first end of the first scrap discharge groove and the rotating axis are respectively located on two sides of the first virtual plane.

In an example, the body includes a virtual cutting plane extending perpendicularly to the rotating axis and passing through the first cutting blade. A spacing between the first cutting blade and the rotating axis and on the virtual cutting plane is smaller than a spacing between any point on the inner periphery of the body facing the cutting space and the rotating axis and on the virtual cutting plane.

In an example, the inner periphery of the body facing the cutting space includes a first evasive portion corresponding to the first cutting blade. The first evasive portion is located on a rear side of the first cutting blade and adjoins the first cutting blade. The first evasive portion has a first side adjacent to the first cutting blade and a second side remote from the first cutting blade. A spacing between the first evasive portion and the rotating axis and on the virtual cutting plane gradually increases from the first side of the first evasive portion toward the second side of the first evasive portion.

In an example, the first cutting blade is integrally formed with the body.

In an example, a width of the cutting space in a diametric direction perpendicular to the rotating axis gradually reduces from the operative end toward the connecting end to form a conic space.

In an example, the inner periphery of the body facing the cutting space further includes a second cutting blade, a third cutting blade, and a fourth cutting blade. The second cutting blade, the third cutting blade, and the fourth cutting blade are integrally formed with the body. A second virtual plane passes through the second cutting blade and extends perpendicularly to the virtual projection plane. A third virtual plane passes through the third cutting blade and extends perpendicularly to the virtual projection plane. A fourth virtual plane passes through the fourth cutting blade and extends perpendicularly to the virtual projection plane.

The virtual projection plane has a second virtual reference line, a third virtual reference line, and a fourth virtual reference line. The second virtual reference line intersects the rotating axis and passes through an intersection of the second virtual plane and the virtual circle. The third virtual reference line intersects the rotating axis and passes through an intersection of the third virtual plane and the virtual circle. The fourth virtual reference line intersects the rotating axis and passes through an intersection of the fourth virtual plane and the virtual circle.

An angle between the second virtual reference line and the second virtual plane and on the virtual projection plane is between 20° and 40°. An angle between the third virtual reference line and the third virtual plane and on the virtual projection plane is between 20° and 40°. An angle between the fourth virtual reference line and the fourth virtual plane and on the virtual projection plane is between 20° and 40°.

An angle between the second cutting blade and a projection axis of the rotating axis onto the second virtual plane is between 25° and 35°. An angle between the third cutting blade and a projection axis of the rotating axis onto the third virtual plane is between 25° and 35°. An angle between the fourth cutting blade and a projection axis of the rotating axis onto the fourth virtual plane is between 25° and 35°.

The virtual cutting plane passes through the second cutting blade, the third cutting blade, and the fourth cutting blade. A spacing between the second cutting blade and the rotating axis and on the virtual cutting plane is smaller than the spacing between any point on the inner periphery of the body facing the cutting space and the rotating axis. A spacing between the third cutting blade and the rotating axis and on the virtual cutting plane is smaller than the spacing between any point on the inner periphery of the body facing the cutting space and the rotating axis. A spacing between the fourth cutting blade and the rotating axis and on the virtual cutting plane is smaller than the spacing between any point on the inner periphery of the body facing the cutting space and the rotating axis.

The inner periphery of the body facing the cutting space includes a second evasive portion, a third evasive portion, and a fourth evasive portion. The inner periphery of the body facing the cutting space further includes a second scrap discharge groove, a third scrap discharge groove, and a fourth scrap discharge groove. Each of the second scrap discharge groove, the third scrap discharge groove, and the fourth scrap discharge groove extends in a radial direction perpendicular to the rotating axis. The second evasive portion and the second scrap discharge groove correspond to the second cutting blade. The third evasive portion and the third scrap discharge groove correspond to the third cutting blade. The fourth evasive portion and the fourth scrap discharge groove correspond to the fourth cutting blade.

The second evasive portion is located on a rear side of the second cutting blade and adjoins the second cutting blade. The second evasive portion has a first side adjacent to the second cutting blade and a second side remote from the second cutting blade. A spacing between the second evasive portion and the rotating axis and on the virtual cutting plane gradually increases from the first side of the second evasive portion toward the second side of the second evasive portion.

The third evasive portion is located on a rear side of the third cutting blade and adjoins the third cutting blade. The third evasive portion has a first side adjacent to the third cutting blade and a second side remote from the third cutting blade. A spacing between the third evasive portion and the rotating axis and on the virtual cutting plane gradually increases from the first side of the third evasive portion toward the second side of the third evasive portion.

The fourth evasive portion is located on a rear side of the fourth cutting blade and adjoins the fourth cutting blade. The fourth evasive portion has a first side adjacent to the fourth cutting blade and a second side remote from the fourth cutting blade. A spacing between the fourth evasive portion and the rotating axis and on the virtual cutting plane gradually increases from the first side of the fourth evasive portion toward the second side of the fourth evasive portion.

The second scrap discharge groove is located on a front side of the second cutting blade and adjoins the second cutting blade. The second scrap discharge groove includes a first end intercommunicating with the cutting space and a second end extending through the body to the outer periphery of the body. The first end of the second scrap discharge groove and the rotating axis are respectively located on two sides of the second virtual plane.

The third scrap discharge groove is located on a front side of the third cutting blade and adjoins the third cutting blade. The third scrap discharge groove includes a first end intercommunicating with the cutting space and a second end extending through the body to the outer periphery of the body. The first end of the third scrap discharge groove and the rotating axis are respectively located on two sides of the third virtual plane.

The fourth scrap discharge groove is located on a front side of the third cutting blade and adjoins the third cutting blade. The fourth scrap discharge groove includes a first end intercommunicating with the cutting space and a second end extending through the body to the outer periphery of the body. The first end of the fourth scrap discharge groove and the rotating axis are respectively located on two sides of the fourth virtual plane. A first end of the first scrap discharge groove intercommunicating with the cutting space and the rotating axis are located on the same side of the first virtual plane.

In another example, the angle between the first virtual reference line and the first virtual plane and on the virtual projection plane is between 5° and 10°. An angle between the second virtual reference line and the second virtual plane and on the virtual projection plane is between 5° and 10°. An angle between the third virtual reference line and the third virtual plane and on the virtual projection plane is between 5° and 10°. An angle between the fourth virtual reference line and the fourth virtual plane and on the virtual projection plane is between 5° and 10°.

In the another example, a first end of the second scrap discharge groove intercommunicating with the cutting space and the rotating axis are located on the same side of the second virtual plane. A first end of the third scrap discharge groove intercommunicating with the cutting space and the rotating axis are located on the same side of the third virtual plane. A first end of the fourth scrap discharge groove intercommunicating with the cutting space and the rotating axis are located on the same side of the fourth virtual plane.

In an example, the outer periphery of the body includes a rectilinear section adjacent to the connecting end and a conical section adjacent to the operative end. The conical section has a width in a diametric direction perpendicular to the rotating axis. The width of the conical section gradually decreases from an end of the conical section adjacent to the operative end to another end of the conical section adjacent to the connecting end. The body further includes a plurality of ribs disposed on the outer periphery of the body and extending in a radial direction perpendicular to the rotating axis. Each of the plurality of ribs has a first end connected to the rectilinear section and a second end connected to the conical section.

The present invention will become clearer in light of the following detailed description of illustrative embodiments of this invention described in connection with the drawings.

DETAILED DESCRIPTION OF THE INVENTION

Figure 1:
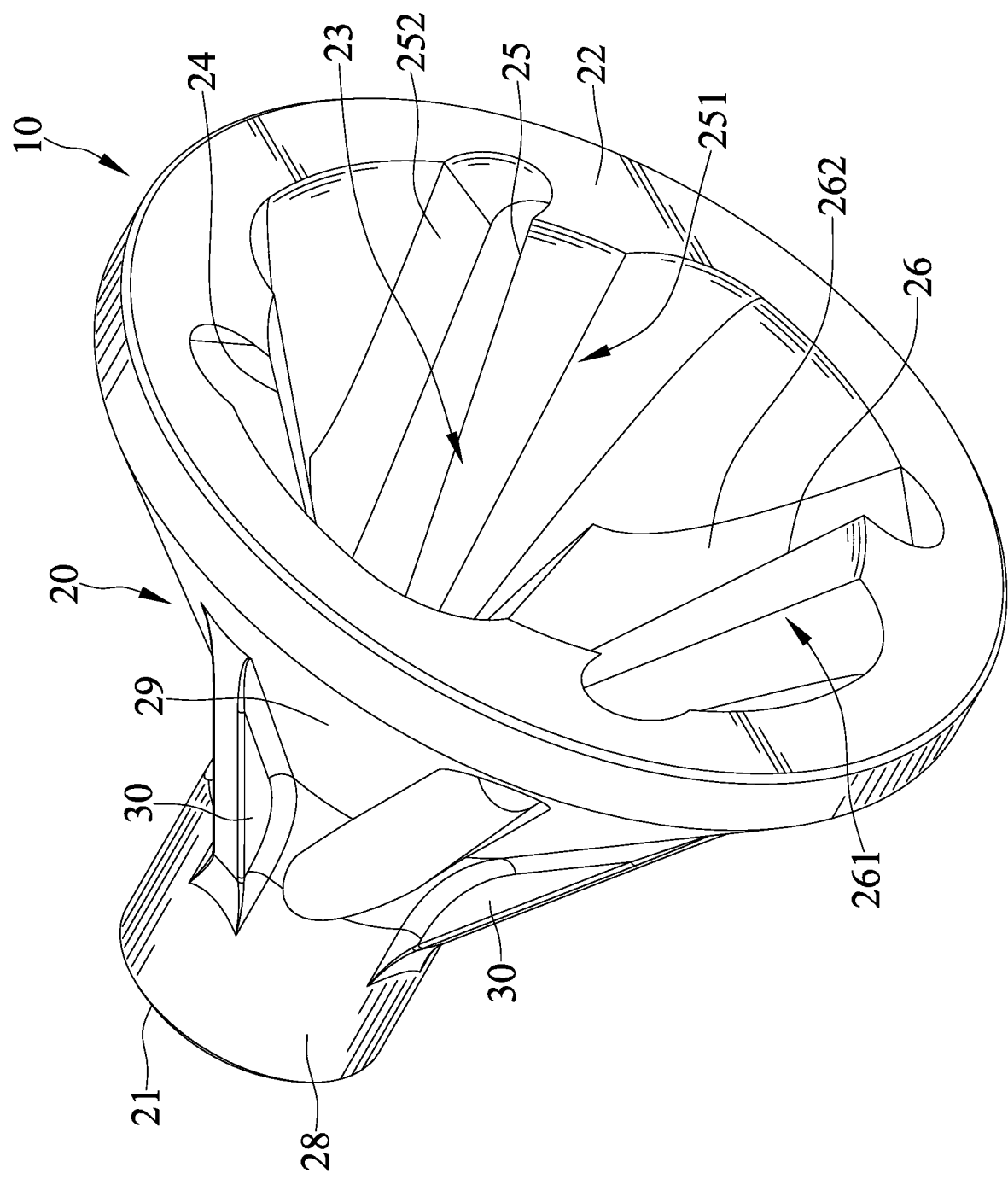
FIG. 1 is a perspective view of a rotary cutter for cutting damaged threads of a bolt of a first embodiment according to the present invention.
Figure 2:
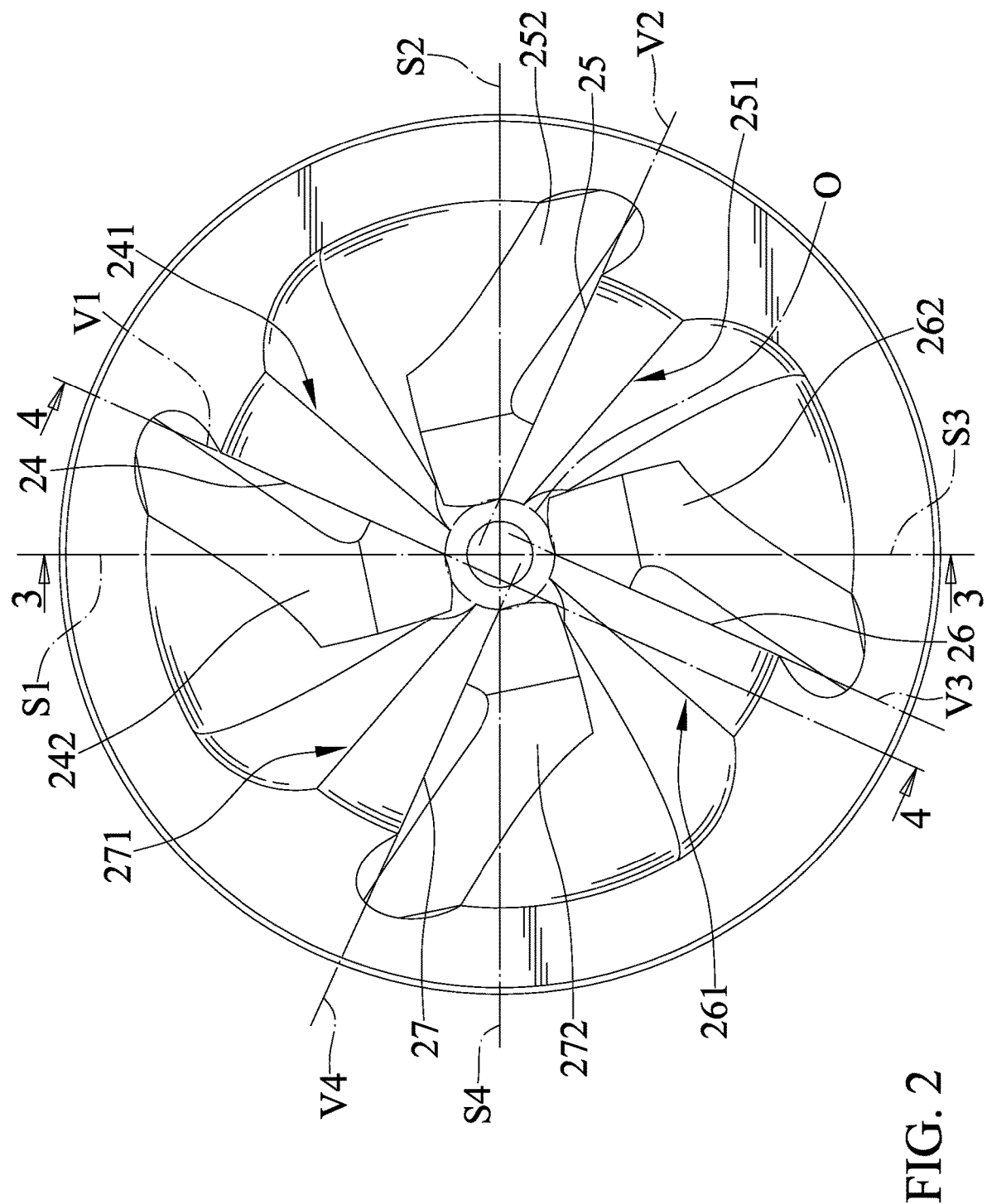
FIG. 2 is a side elevational view of the rotary cutter of FIG. 1.
Figure 3:
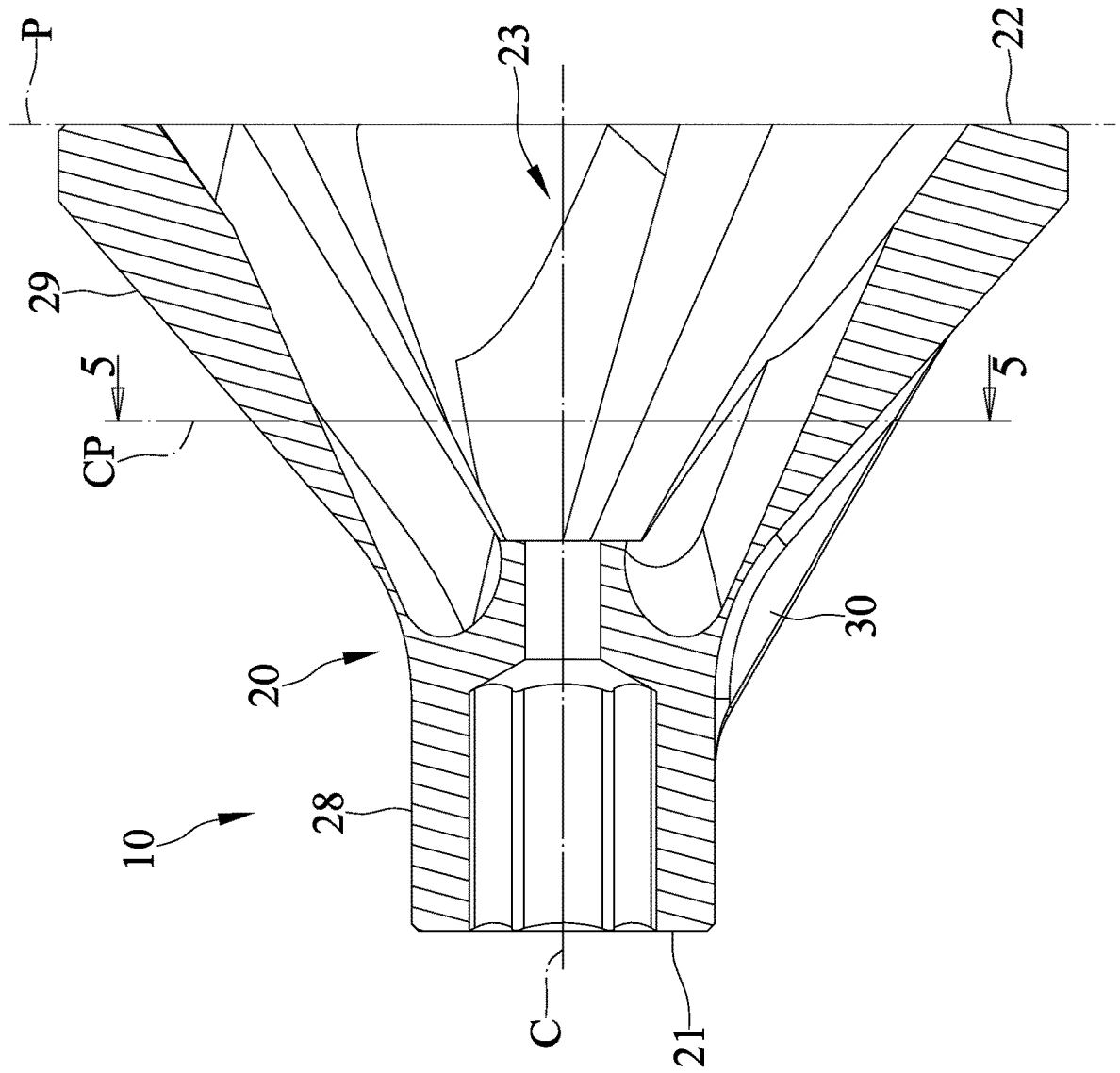
FIG. 3 is a cross sectional view taken along section line 3-3 of FIG. 2.
Figure 4:
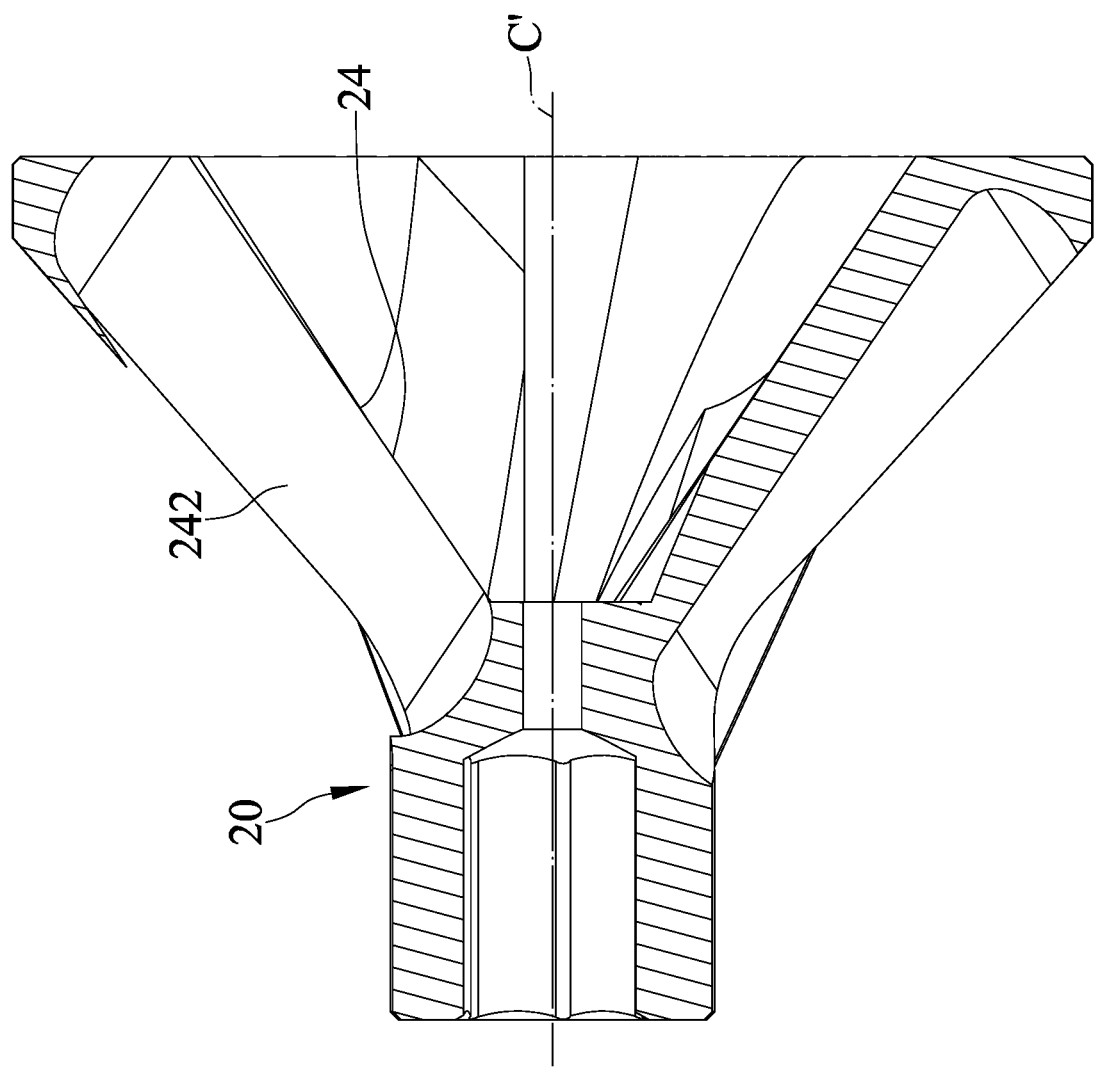
FIG. 4 is a cross sectional view taken along section line 4-4 of FIG. 2.
Figure 5:
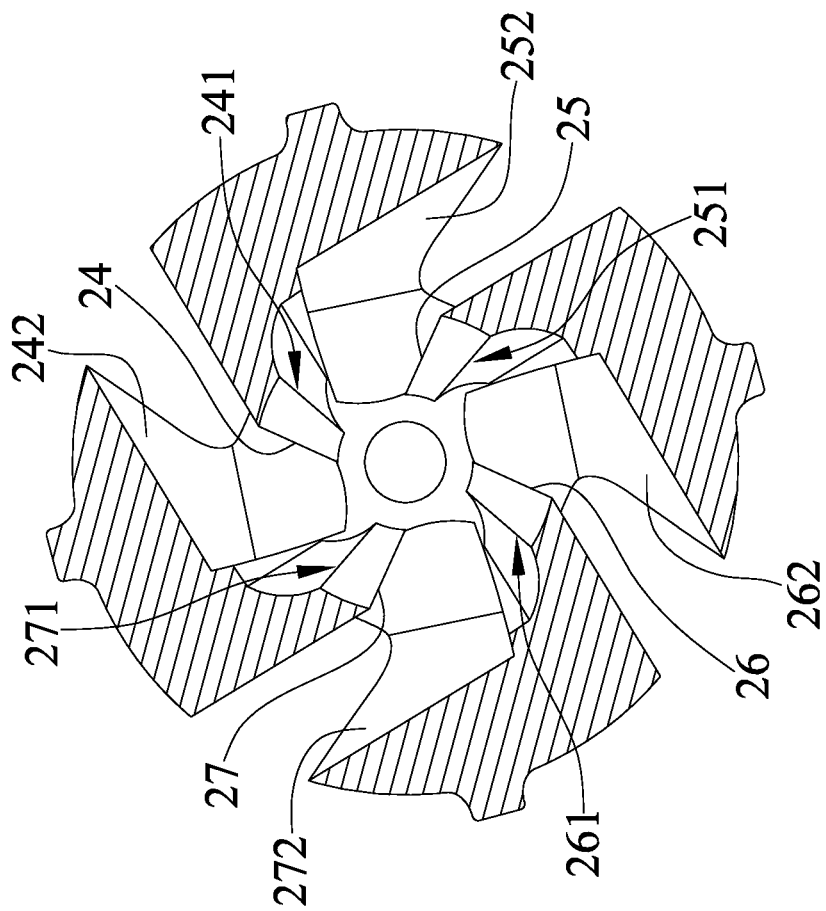
FIG. 5 is cross sectional view taken along section line 5-5 of FIG. 3.

With reference to FIGS. 1-5, a rotary cutter for cutting damaged threads of a bolt of a first embodiment according to the present invention includes a body 20 rotatable about a rotating axis C. The body 20 includes a connecting end 21 and an operative end 22 opposite to the connecting end 21 along the rotating axis C. The connecting end 21 can be coupled to an electric tool or a pneumatic tool. A cutting space 23 extends along the rotating axis C from the operative end 22 towards but spaced from the connecting end 21. A width of the cutting space 23 in a diametric direction perpendicular to the rotating axis C gradually reduces from the operative end 22 toward the connecting end 21 to form a conic space.

The body 20 further includes a first cutting blade 24 disposed on an inner periphery thereof facing the cutting space 23. The first cutting blade 24 is integrally formed with the body 20. The body 20 further includes a virtual projection plane P perpendicular to the rotating axis C. A first virtual plane V1 passes through the first cutting blade 24 and extends perpendicularly to the virtual projection plane P. A virtual circle O and a first virtual reference line S1 are located on the virtual projection plane P. The virtual circle O has a diameter between 1 mm and 20 mm. The first virtual reference line S1 intersects the rotating axis C and passes through an intersection of the first virtual plane V1 and the virtual circle O. An angle between the first virtual reference line S1 and the first virtual plane V1 and on the virtual projection plane P is between 5° and 40°. In this embodiment, the angle between the first virtual reference line S1 and the first virtual plane V1 is between 20° and 40°.

The rotating axis C has a projection (a projection axis C') onto the first virtual plane V1. An angle between the first cutting blade 24 and the projection axis C' is between 25° and 35°.

The body 20 includes a virtual cutting plane CP extending perpendicularly to the rotating axis C and passing through the first cutting blade 24. A spacing between the first cutting blade 24 and the rotating axis C and on the virtual cutting plane CP is smaller than a spacing between any point on the inner periphery of the body 20 facing the cutting space 23 and the rotating axis C and on the virtual cutting plane CP (see FIG. 5).

The inner periphery of the body 20 facing the cutting space 23 includes a first evasive portion 241 and a first scrap discharge groove 242 in a radial direction perpendicular to the rotating axis C. The first evasive portion 241 and the first scrap discharge groove 242 correspond to the first cutting blade 24. The first evasive portion 241 is located on a rear side of the first cutting blade 24 and adjoins the first cutting blade 24. The first evasive portion 241 has a first side adjacent to the first cutting blade 24 and a second side remote from the first cutting blade 24. A spacing between the first evasive portion 241 and the rotating axis C and on the virtual cutting plane CP gradually increases from the first side of the first evasive portion 241 toward the second side of the first evasive portion 241. The first scarp discharge groove 242 is located on a front side of the first cutting blade 24 and adjoins the first cutting blade 24. The first scrap discharge groove 242 includes a first end intercommunicating with the cutting space 23 and a second end extending through the body 20 to an outer periphery of the body 20. The first end of the first scrap discharge groove 242 and the rotating axis C are respectively located on two sides of the first virtual plane V1.

The inner periphery of the body 20 facing the cutting space 23 further includes a second cutting blade 25, a third cutting blade 26, and a fourth cutting blade 27. The second cutting blade 25, the third cutting blade 26, and the fourth cutting blade 27 are integrally formed with the body 20. A second virtual plane V2 passes through the second cutting blade 25 and extends perpendicularly to the virtual projection plane P. A third virtual plane V3 passes through the third cutting blade 26 and extends perpendicularly to the virtual projection plane P. A fourth virtual plane V4 passes through the fourth cutting blade 27 and extends perpendicularly to the virtual projection plane P.

The virtual projection plane P has a second virtual reference line S2, a third virtual reference line S3, and a fourth virtual reference line S4. The second virtual reference line S2 intersects the rotating axis C and passes through an intersection of the second virtual plane V2 and the virtual circle O. The third virtual reference line S3 intersects the rotating axis C and passes through an intersection of the third virtual plane V3 and the virtual circle O. The fourth virtual reference line S4 intersects the rotating axis C and passes through an intersection of the fourth virtual plane V4 and the virtual circle O.

An angle between the second virtual reference line S2 and the second virtual plane V2 and on the virtual projection plane P is between 20° and 40°. An angle between the third virtual reference line S3 and the third virtual plane V3 and on the virtual projection plane P is between 20° and 40°. An angle between the fourth virtual reference line S4 and the fourth virtual plane V4 and on the virtual projection plane P is between 20° and 40°.

An angle between the second cutting blade 25 and a projection axis of the rotating axis C onto the second virtual plane V2 is between 25° and 35°. An angle between the third cutting blade 26 and a projection axis of the rotating axis C onto the third virtual plane V3 is between 25° and 35°. An angle between the fourth cutting blade 27 and a projection axis of the rotating axis C onto the fourth virtual plane V4 is between 25° and 35°.

The virtual cutting plane CP passes through the second cutting blade 25, the third cutting blade 26, and the fourth cutting blade 27. A spacing between the second cutting blade 25 and the rotating axis C and on the virtual cutting plane CP is smaller than the spacing between any point on the inner periphery of the body 20 facing the cutting space 23 and the rotating axis C. A spacing between the third cutting blade 26 and the rotating axis C and on the virtual cutting plane CP is smaller than the spacing between any point on the inner periphery of the body 20 facing the cutting space 23 and the rotating axis C. A spacing between the fourth cutting blade 27 and the rotating axis C and on the virtual cutting plane CP is smaller than the spacing between any point on the inner periphery of the body 20 facing the cutting space 23 and the rotating axis C.

The inner periphery of the body 20 facing the cutting space 23 includes a second evasive portion 251, a third evasive portion 261, and a fourth evasive portion 271. The inner periphery of the body 20 facing the cutting space 23 further includes a second scrap discharge groove 252, a third scrap discharge groove 262, and a fourth scrap discharge groove 272. Each of the second scrap discharge groove 252, the third scrap discharge groove 262, and the fourth scrap discharge groove 272 extends in a radial direction perpendicular to the rotating axis C. The second evasive portion 251 and the second scrap discharge groove 252 correspond to the second cutting blade 25. The third evasive portion 261 and the third scrap discharge groove 262 correspond to the third cutting blade 26. The fourth evasive portion 271 and the fourth scrap discharge groove 272 correspond to the fourth cutting blade 27.

The second evasive portion 251 is located on a rear side of the second cutting blade 25 and adjoins the second cutting blade 25. The second evasive portion 251 has a first side adjacent to the second cutting blade 25 and a second side remote from the second cutting blade 25. A spacing between the second evasive portion 251 and the rotating axis C and on the virtual cutting plane CP gradually increases from the first side of the second evasive portion 251 toward the second side of the second evasive portion 251.

The third evasive portion 261 is located on a rear side of the third cutting blade 26 and adjoins the third cutting blade 26. The third evasive portion 261 has a first side adjacent to the third cutting blade 26 and a second side remote from the third cutting blade 26. A spacing between the third evasive portion 261 and the rotating axis C and on the virtual cutting plane CP gradually increases from the first side of the third evasive portion 261 toward the second side of the third evasive portion 261.

The fourth evasive portion 271 is located on a rear side of the fourth cutting blade 27 and adjoins the fourth cutting blade 27. The fourth evasive portion 271 has a first side adjacent to the fourth cutting blade 27 and a second side remote from the fourth cutting blade 27. A spacing between the fourth evasive portion 271 and the rotating axis C and on the virtual cutting plane CP gradually increases from the first side of the fourth evasive portion 271 toward the second side of the fourth evasive portion 271.

The second scrap discharge groove 252 is located on a front side of the second cutting blade 25 and adjoins the second cutting blade 25. The second scrap discharge groove 252 includes a first end intercommunicating with the cutting space 23 and a second end extending through the body 20 to the outer periphery of the body 20. The first end of the second scrap discharge groove 252 and the rotating axis C are respectively located on two sides of the second virtual plane V2.

The third scrap discharge groove 262 is located on a front side of the third cutting blade 26 and adjoins the third cutting blade 26. The third scrap discharge groove 262 includes a first end intercommunicating with the cutting space 23 and a second end extending through the body 20 to the outer periphery of the body 20. The first end of the third scrap discharge groove 262 and the rotating axis C are respectively located on two sides of the third virtual plane V3.

The fourth scrap discharge groove 272 is located on a front side of the third cutting blade 27 and adjoins the third cutting blade 27. The fourth scrap discharge groove 272 includes a first end intercommunicating with the cutting space 23 and a second end extending through the body 20 to the outer periphery of the body 20. The first end of the fourth scrap discharge groove 272 and the rotating axis C are respectively located on two sides of the fourth virtual plane V4.

The outer periphery of the body 20 includes a rectilinear section 28 adjacent to the connecting end 21 and a conical section 29 adjacent to the operative end 22. The conical section 29 has a width in a diametric direction perpendicular to the rotating axis C. The width of the conical section 29 gradually decreases from an end of the conical section 29 adjacent to the operative end 22 to another end of the conical section 29 adjacent to the connecting end 21. The body 20 further includes a plurality of ribs 30 disposed on the outer periphery of the body 20 and extending in a radial direction perpendicular to the rotating axis C. Each of the plurality of ribs 30 has a first end connected to the rectilinear section 28 and a second end connected to the conical section 29.

Figure 6:
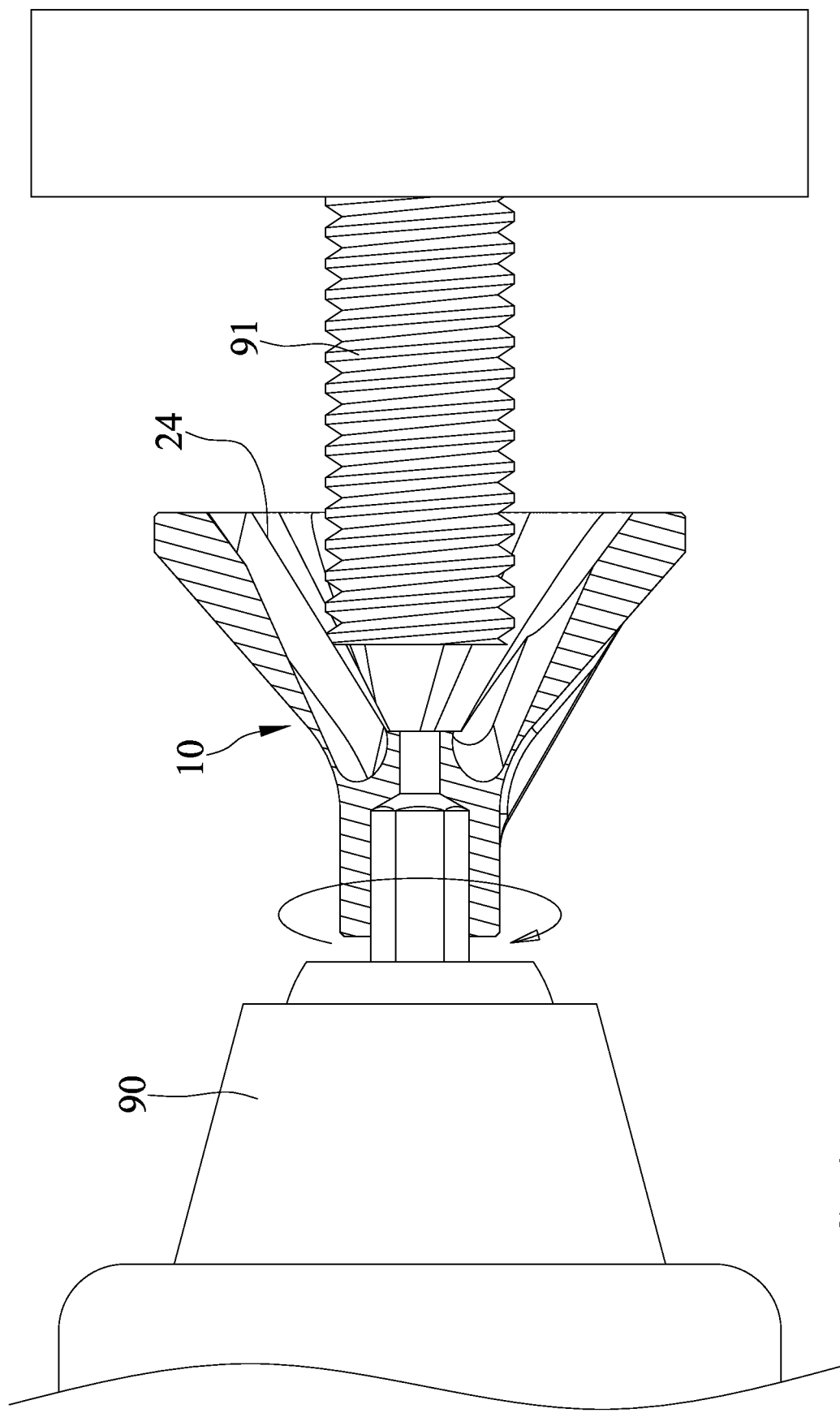
FIG. 6 is a diagrammatic cross sectional view illustrating use of the rotary cutter of FIG. 1.
Figure 7:
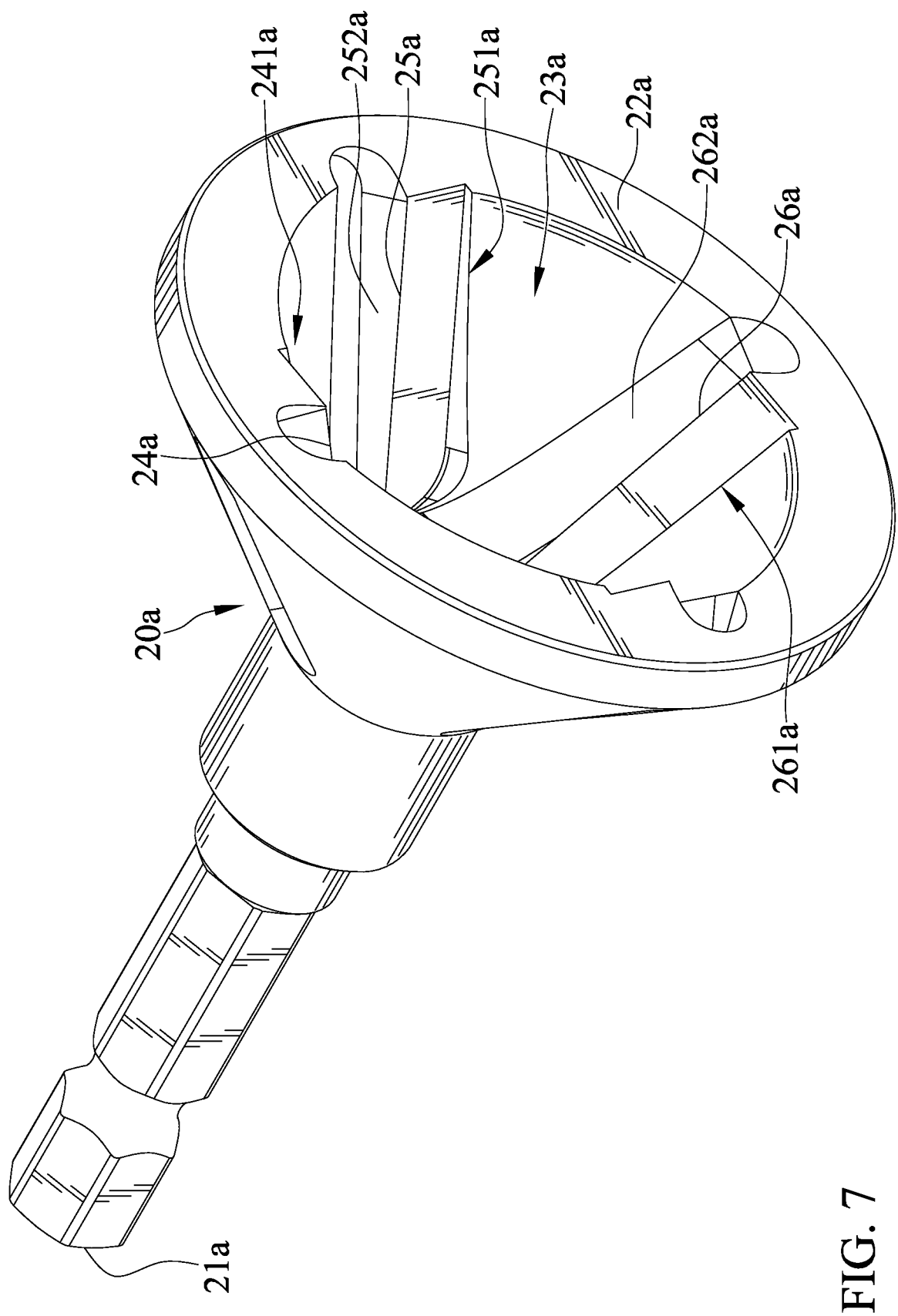
FIG. 7 is a perspective view of a rotary cutter for cutting damaged threads of a bolt of a second embodiment according to the present invention.
Figure 8:
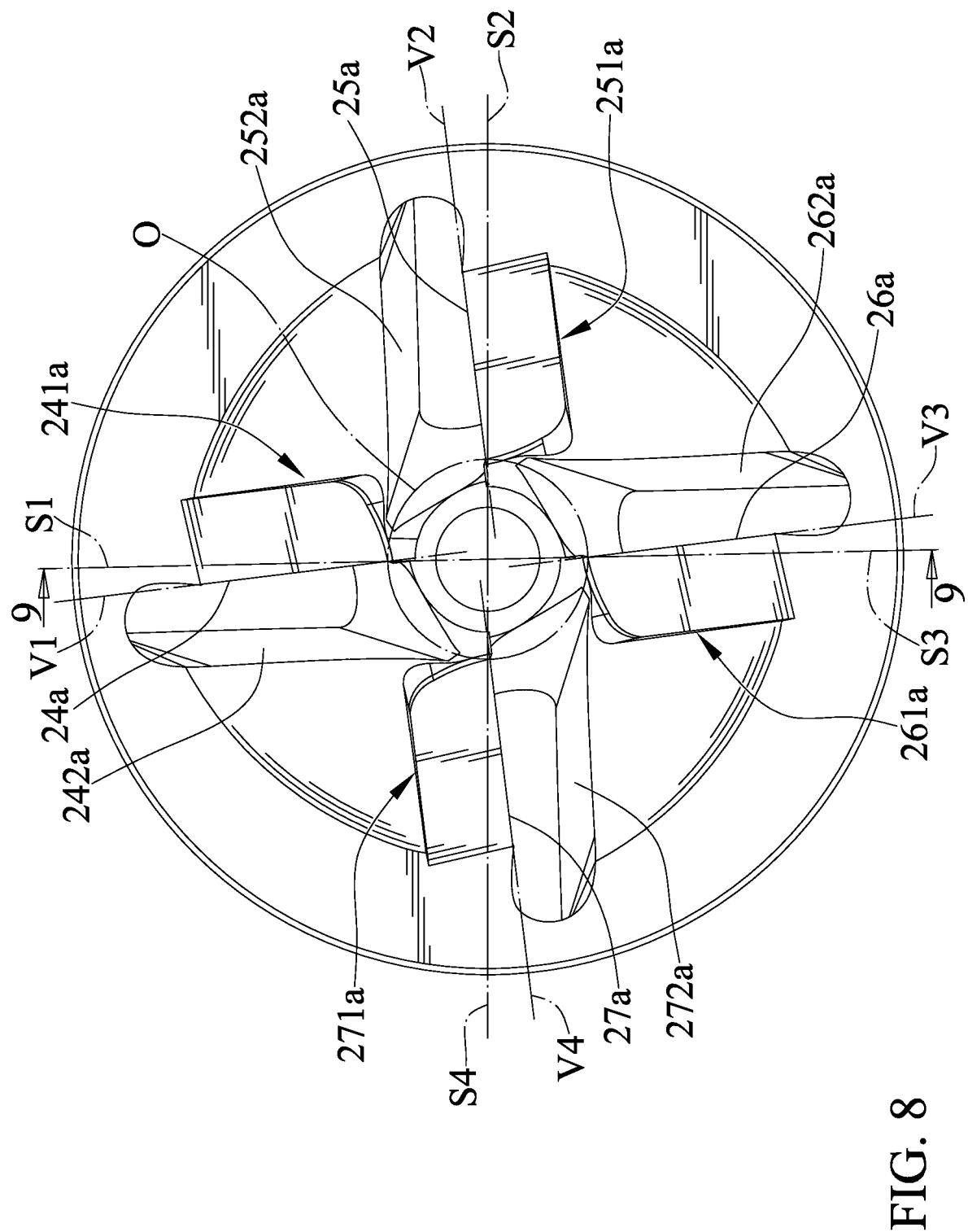
FIG. 8 is a side elevational view of the rotary cutter of FIG. 7.
Figure 9:
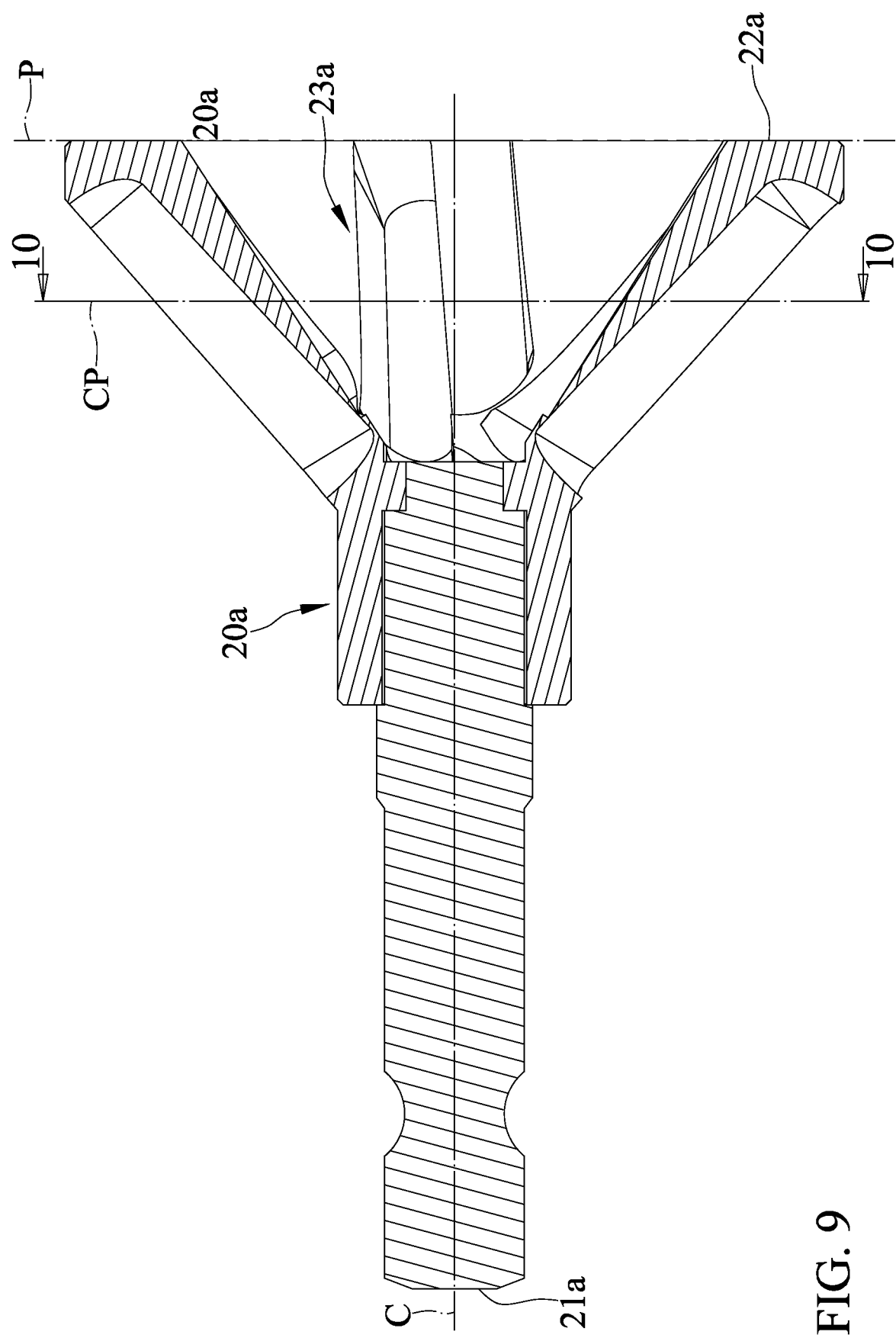
FIG. 9 is a cross sectional view taken along section line 9-9 of FIG. 8.
Figure 10:
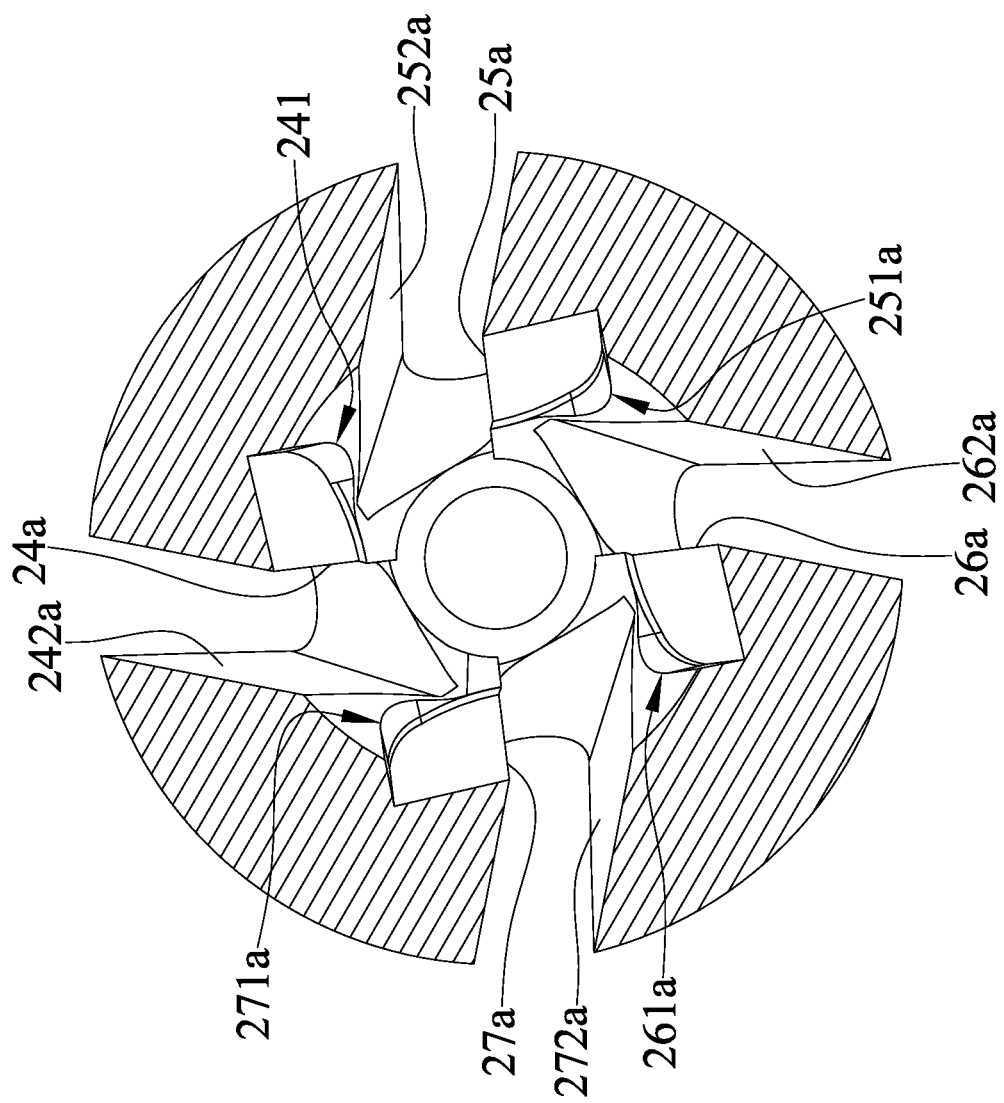
FIG. 10 is a cross sectional view taken along section line 10-10 of FIG. 9.

With reference to FIG. 6, in use, the connecting end 21 is coupled to a driving tool 90, and the cutting space 23 holds a distal end of the bolt 91. The driving tool 90 drives the rotary cutter 10 to rotate. The first cutting blade 24 shortens or cuts off a portion of the thread on the distal end of the bolt 91, such that a nut can be easily threaded onto the bolt 91.

In view of the above structure of the rotary cutter 10, since only the first cutting blade 24 contacts the bolt 91, the resistance resulting from friction is reduced to assure a smooth cutting process, and the scrap resulting from the cutting can be discharged from the first scrap discharge groove 241. Furthermore, the rotary cutter 10 having the above angles can effectively reduce the cutting resistance, such that the rotary cutter 10 is apt to jump during the cutting process and such that the first cutting blade 24 is less likely to wear.

FIGS. 7-10 show a rotary cutter for cutting damaged threads of a bolt of a second embodiment according to the present invention. The second embodiment is substantially the same as the first embodiment except that the wherein the inner periphery of the body 20a facing the cutting space 23a includes a first scrap discharge groove 242a in a radial direction perpendicular to the rotating axis C. The first scrap discharge groove 242a corresponds to the first cutting blade 24a, is located on a front side of the first cutting blade 24a, and adjoins the first cutting blade 24a. The first scrap discharge groove 242a includes a first end intercommunicating with the cutting space 23a and a second end extending through the body 20a to the outer periphery of the body 20a. In this embodiment, the angle between the first virtual reference line S1 and the first virtual plane V1 and on the virtual projection plane P is between 5° and 10°. The first end of the first scrap discharge groove 242a and the rotating axis C are located on the same side of the first virtual plane V1.

The body 20a includes a virtual cutting plane CP extending perpendicularly to the rotating axis C and extending through the first cutting blade 24a. A spacing between the first cutting blade 24a and the rotating axis C and on the virtual cutting plane CP is smaller than a spacing between any point on the inner periphery of the body 20a facing the cutting space 23a and the rotating axis C and on the virtual cutting plane CP (see FIG. 10).

The inner periphery of the body 20a facing the cutting space 23a includes a first evasive portion 241a corresponding to the first cutting blade 24a. The first evasive portion 241a is located on a rear side of the first cutting blade 24a and adjoins the first cutting blade 24a. The first evasive portion 241a has a first side adjacent to the first cutting blade 24a and a second side remote from the first cutting blade 24a. A spacing between the first evasive portion 241a and the rotating axis C and on the virtual cutting plane CP gradually increases from the first side of the first evasive portion 241a toward the second side of the first evasive portion 241a.

The first cutting blade 24a is integrally formed with the body 20a. A width of the cutting space 23a in a diametric direction perpendicular to the rotating axis C gradually reduces from the operative end 22a toward the connecting end 21a to form a conic space.

The inner periphery of the body 20a facing the cutting space 23a further includes a second cutting blade 25a, a third cutting blade 26a, and a fourth cutting blade 27a. The second cutting blade 25a, the third cutting blade 26a, and the fourth cutting blade 27a are integrally formed with the body 20a. A second virtual plane V2 passes through the second cutting blade 25a and extends perpendicularly to the virtual projection plane P. A third virtual plane V3 passes through the third cutting blade 26a and extends perpendicularly to the virtual projection plane P. A fourth virtual plane V4 passes through the fourth cutting blade 27a and extends perpendicularly to the virtual projection plane P.

The virtual projection plane P has a second virtual reference line S2, a third virtual reference line S3, and a fourth virtual reference line S4. The second virtual reference line S2 intersects the rotating axis C and passes through an intersection of the second virtual reference line S2 and the virtual circle O. The third virtual reference line S3 intersects the rotating axis C and passes through an intersection of the third virtual plane V3 and the virtual circle O. The fourth virtual reference line S4 intersects the rotating axis C and passes through an intersection of the fourth virtual plane V4 and the virtual circle O.

An angle between the second virtual reference line S2 and the second virtual plane V2 and on the virtual projection plane P is between 5° and 10°. An angle between the third virtual reference line S3 and the third virtual plane V3 and on the virtual projection plane P is between 5° and 10°. An angle between the fourth virtual reference line S4 and the fourth virtual plane V4 and on the virtual projection plane P is between 5° and 10°. An angle between the second cutting blade 25a and a projection axis of the rotating axis C onto the second virtual plane V2 is between 25° and 35°. An angle between the third cutting blade 26a and a projection axis of the rotating axis C onto the third virtual plane V3 is between 25° and 35°. An angle between the fourth cutting blade 27a and a projection axis of the rotating axis C onto the fourth virtual plane V4 is between 25° and 35°.

The virtual cutting plane CP passes through the second cutting blade 25a, the third cutting blade 26a, and the fourth cutting blade 27a. A spacing between the second cutting blade 25a and the rotating axis C and on the virtual cutting plane CP is smaller than the spacing between any point on the inner periphery of the body 20a facing the cutting space 23a and the rotating axis C. A spacing between the third cutting blade 26a and the rotating axis C and on the virtual cutting plane CP is smaller than the spacing between any point on the inner periphery of the body 20a facing the cutting space 23a and the rotating axis C. A spacing between the fourth cutting blade 27a and the rotating axis C and on the virtual cutting plane CP is smaller than the spacing between any point on the inner periphery of the body 20a facing the cutting space 23a and the rotating axis C.

The inner periphery of the body 20a facing the cutting space 23a includes a second evasive portion 251a, a third evasive portion 261a, and a fourth evasive portion 271a. The inner periphery of the body 20a facing the cutting space 23a further includes a second scrap discharge groove 252a, a third scrap discharge groove 262a, and a fourth scrap discharge groove 272a. Each of the second scrap discharge groove 252a, the third scrap discharge groove 262a, and the fourth scrap discharge groove 272a extends in a radial direction perpendicular to the rotating axis C. The second evasive portion 251a and the second scrap discharge groove 252a correspond to the second cutting blade 25a. The third evasive portion 261a and the third scrap discharge groove 262a correspond to the third cutting blade 26a.

The fourth evasive portion 271a and the fourth scrap discharge groove 272a correspond to the fourth cutting blade 27a The second evasive portion 251a is located on a rear side of the second cutting blade 25a and adjoins the second cutting blade 25a. The second evasive portion 251a has a first side adjacent to the second cutting blade 25a and a second side remote from the second cutting blade 25a. A spacing between the second evasive portion 251a and the rotating axis C and on the virtual cutting plane CP gradually increases from the first side of the second evasive portion 251a toward the second side of the second evasive portion 251a.

The third evasive portion 261a is located on a rear side of the third cutting blade 26a and adjoins the third cutting blade 26a. The third evasive portion 261a has a first side adjacent to the third cutting blade 26a and a second side remote from the third cutting blade 26a. A spacing between the third evasive portion 261a and the rotating axis C and on the virtual cutting plane CP gradually increases from the first side of the third evasive portion 261a toward the second side of the third evasive portion 261a.

The fourth evasive portion 271a is located on a rear side of the fourth cutting blade 27a and adjoins the fourth cutting blade 27a. The fourth evasive portion 271a has a first side adjacent to the fourth cutting blade 27a and a second side remote from the fourth cutting blade 27a. A spacing between the fourth evasive portion 271a and the rotating axis C and on the virtual cutting plane CP gradually increases from the first side of the fourth evasive portion 271a toward the second side of the fourth evasive portion 271a.

The second scrap discharge groove 252a is located on a front side of the second cutting blade 25a and adjoins the second cutting blade 25a. The second scrap discharge groove 252a includes a first end intercommunicating with the cutting space 23a and a second end extending through the body 20a to the outer periphery of the body 20a. The first end of the second scrap discharge groove 252a and the rotating axis C are located on the same side of the second virtual plane V2.

The third scrap discharge groove 262a is located on a front side of the third cutting blade 26a and adjoins the third cutting blade 26a. The third scrap discharge groove 262a includes a first end intercommunicating with the cutting space 23a and a second end extending through the body 20a to the outer periphery of the body 20a. The first end of the third scrap discharge groove 262a and the rotating axis C are located on the same side of the third virtual plane V3.

The fourth scrap discharge groove 272a is located on a front side of the fourth cutting blade 27a and adjoins the fourth cutting blade 27a. The fourth scrap discharge groove 272a includes a first end intercommunicating with the cutting space 23a and a second end extending through the body 20a to the outer periphery of the body 20a. The first end of the fourth scrap discharge groove 272a and the rotating axis C are located on the same side of the fourth virtual plane V4.

In view of the foregoing, the rotary cutter for cutting damaged threads of a bolt includes a body 20, 20a rotatable about a rotating axis C. The body 20, 20a includes a connecting end 21, 21a and an operative end 22, 22a opposite to the connecting end 21, 21a along the rotating axis C. A cutting space 23, 23a extends along the rotating axis C from the operative end 22, 22a towards but spaced from the connecting end 21, 21a. The body 20, 20a further includes a first cutting blade 24, 24a disposed on an inner periphery thereof facing the cutting space 23, 23a. The body 20, 20a further includes a virtual projection plane P perpendicular to the rotating axis C. A first virtual plane V1 passes through the first cutting blade 24, 24a and extends perpendicularly to the virtual projection plane P. A virtual circle O and a first virtual reference line S1 are located on the virtual projection plane P. The virtual circle O has a diameter between 1 mm and 20 mm. The first virtual reference line S1 intersects the rotating axis C and passes through an intersection of the first virtual plane V1 and the virtual circle O. An angle between the first virtual reference line S1 and the first virtual plane V1 and on the virtual projection plane P is between 5° and 40°. The rotary cutter 10 having the above angles can effectively reduce the cutting resistance, such that the rotary cutter 10 is apt to jump during the cutting process and such that the first cutting blade 24, 24a is less likely to wear.

Although specific embodiments have been illustrated and described, numerous modifications and variations are still possible without departing from the scope of the invention. The scope of the invention is limited by the accompanying claims.

The invention claimed is:

1. A rotary cutter for cutting damaged threads of a bolt, comprising: a body rotatable about a rotating axis, wherein the body includes a connecting end and an operative end opposite to the connecting end along the rotating axis, wherein a cutting space extends along the rotating axis from the operative end towards but spaced from the connecting end, wherein the body further includes a first cutting blade disposed on an inner periphery thereof facing the cutting space, wherein the inner periphery of the body facing the cutting space includes a first scrap discharge groove, wherein the first scrap discharge groove corresponds to the first cutting blade, is located on a front side of the first cutting blade, and adjoins the first cutting blade, wherein the first scrap discharge groove includes a first end intercommunicating with the cutting space and a second end extending through the body to an outer periphery of the body, wherein the body further includes a virtual projection plane perpendicular to the rotating axis, wherein a first virtual plane passes through the first cutting blade and extends perpendicularly to the virtual projection plane, wherein a virtual circle and a first virtual reference line are located on the virtual projection plane, wherein the virtual circle has a diameter between 1 mm and 20 mm, wherein the first virtual reference line intersects the rotating axis and passes through an intersection of the first virtual plane and the virtual circle, and wherein an angle between the first virtual reference line and the first virtual plane and on the virtual projection plane is between 5° and 40°, and wherein the first end of the first scrap discharge groove and the rotating axis are respectively located on two sides of the first virtual plane.

2. The rotary cutter for cutting damaged threads of the bolt as claimed in claim 1, wherein a projection axis is a projection of the rotating axis onto the first virtual plane, and wherein an angle between the first cutting blade and the projection axis is between 25° and 35°.

3. The rotary cutter for cutting damaged threads of the bolt as claimed in claim 2, wherein the angle between the first virtual reference line and the first virtual plane and on the virtual projection plane is between 20° and 40°.

4. The rotary cutter for cutting damaged threads of the bolt as claimed in claim 3, wherein the body includes a virtual cutting plane extending perpendicularly to the rotating axis and passing through the first cutting blade, and wherein a spacing between the first cutting blade and the rotating axis and on the virtual cutting plane is smaller than a spacing between any point on the inner periphery of the body facing the cutting space and the rotating axis and on the virtual cutting plane.

5. The rotary cutter for cutting damaged threads of the bolt as claimed in claim 4, wherein the inner periphery of the body facing the cutting space includes a first evasive portion corresponding to the first cutting blade, wherein the first evasive portion is located on a rear side of the first cutting blade and adjoins the first cutting blade, wherein the first evasive portion has a first side adjacent to the first cutting blade and a second side remote from the first cutting blade, and wherein a spacing between the first evasive portion and the rotating axis and on the virtual cutting plane gradually increases from the first side of the first evasive portion toward the second side of the first evasive portion.

6. The rotary cutter for cutting damaged threads of the bolt as claimed in claim 5, wherein the first cutting blade is integrally formed with the body.

7. The rotary cutter for cutting damaged threads of the bolt as claimed in claim 6, wherein a width of the cutting space in a diametric direction perpendicular to the rotating axis gradually reduces from the operative end toward the connecting end to form a conic space.

8. The rotary cutter for cutting damaged threads of the bolt as claimed in claim 7, wherein the inner periphery of the body facing the cutting space further includes a second cutting blade, a third cutting blade, and a fourth cutting blade, wherein the second cutting blade, the third cutting blade, and the fourth cutting blade are integrally formed with the body, wherein a second virtual plane passes through the second cutting blade and extends perpendicularly to the virtual projection plane, wherein a third virtual plane passes through the third cutting blade and extends perpendicularly to the virtual projection plane, wherein a fourth virtual plane passes through the fourth cutting blade and extends perpendicularly to the virtual projection plane, wherein the virtual projection plane has a second virtual reference line, a third virtual reference line, and a fourth virtual reference line, wherein the second virtual reference line intersects the rotating axis and passes through an intersection of the second virtual plane and the virtual circle, wherein the third virtual reference line intersects the rotating axis and passes through an intersection of the third virtual plane and the virtual circle, wherein the fourth virtual reference line intersects the rotating axis and passes through an intersection of the fourth virtual plane and the virtual circle, wherein an angle between the second virtual reference line and the second virtual plane and on the virtual projection plane is between 20° and 40°, wherein an angle between the third virtual reference line and the third virtual plane and on the virtual projection plane is between 20° and 40°, wherein an angle between the fourth virtual reference line and the fourth virtual plane and on the virtual projection plane is between 20° and 40°, wherein an angle between the second cutting blade and a projection axis of the rotating axis onto the second virtual plane is between 25° and 35°, wherein an angle between the third cutting blade and a projection axis of the rotating axis onto the third virtual plane is between 25° and 35°, wherein an angle between the fourth cutting blade and a projection axis of the rotating axis onto the fourth virtual plane is between 25° and 35°, wherein the virtual cutting plane passes through the second cutting blade, the third cutting blade, and the fourth cutting blade, wherein a spacing between the second cutting blade and the rotating axis and on the virtual cutting plane is smaller than the spacing between any point on the inner periphery of the body facing the cutting space and the rotating axis, wherein a spacing between the third cutting blade and the rotating axis and on the virtual cutting plane is smaller than the spacing between any point on the inner periphery of the body facing the cutting space and the rotating axis, wherein a spacing between the fourth cutting blade and the rotating axis and on the virtual cutting plane is smaller than the spacing between any point on the inner periphery of the body facing the cutting space and the rotating axis, wherein the inner periphery of the body facing the cutting space includes a second evasive portion, a third evasive portion, and a fourth evasive portion, wherein the inner periphery of the body facing the cutting space further includes a second scrap discharge groove, a third scrap discharge groove, and a fourth scrap discharge groove, with each of the second scrap discharge groove, the third scrap discharge groove, and the fourth scrap discharge groove extending in a radial direction perpendicular to the rotating axis, wherein the second evasive portion and the second scrap discharge groove correspond to the second cutting blade, wherein the third evasive portion and the third scrap discharge groove correspond to the third cutting blade, wherein the fourth evasive portion and the fourth scrap discharge groove correspond to the fourth cutting blade, wherein the second evasive portion is located on a rear side of the second cutting blade and adjoins the second cutting blade, wherein the second evasive portion has a first side adjacent to the second cutting blade and a second side remote from the second cutting blade, wherein a spacing between the second evasive portion and the rotating axis and on the virtual cutting plane gradually increases from the first side of the second evasive portion toward the second side of the second evasive portion, wherein the third evasive portion is located on a rear side of the third cutting blade and adjoins the third cutting blade, wherein the third evasive portion has a first side adjacent to the third cutting blade and a second side remote from the third cutting blade, wherein a spacing between the third evasive portion and the rotating axis and on the virtual cutting plane gradually increases from the first side of the third evasive portion toward the second side of the third evasive portion, wherein the fourth evasive portion is located on a rear side of the fourth cutting blade and adjoins the fourth cutting blade, wherein the fourth evasive portion has a first side adjacent to the fourth cutting blade and a second side remote from the fourth cutting blade, wherein a spacing between the fourth evasive portion and the rotating axis and on the virtual cutting plane gradually increases from the first side of the fourth evasive portion toward the second side of the fourth evasive portion, wherein the second scrap discharge groove is located on a front side of the second cutting blade and adjoins the second cutting blade, wherein the second scrap discharge groove includes a first end intercommunicating with the cutting space and a second end extending through the body to the outer periphery of the body, wherein the first end of the second scrap discharge groove and the rotating axis are respectively located on two sides of the second virtual plane, wherein the third scrap discharge groove is located on a front side of the third cutting blade and adjoins the third cutting blade, wherein the third scrap discharge groove includes a first end intercommunicating with the cutting space and a second end extending through the body to the outer periphery of the body, wherein the first end of the third scrap discharge groove and the rotating axis are respectively located on two sides of the third virtual plane, wherein the fourth scrap discharge groove is located on a front side of the third cutting blade and adjoins the third cutting blade, wherein the fourth scrap discharge groove includes a first end intercommunicating with the cutting space and a second end extending through the body to the outer periphery of the body, and wherein the first end of the fourth scrap discharge groove and the rotating axis are respectively located on two sides of the fourth virtual plane.

9. The rotary cutter for cutting damaged threads of the bolt as claimed in claim 8, wherein the body includes a rectilinear section adjacent to the connecting end and a conical section adjacent to the operative end, wherein the conical section has a width in a diametric direction perpendicular to the rotating axis, wherein the width of the conical section gradually decreases from an end of the conical section adjacent to the operative end to another end of the conical section adjacent to the connecting end, wherein the body further includes a plurality of ribs disposed on the outer periphery of the body and extending in a radial direction perpendicular to the rotating axis, and wherein each of the plurality of ribs has a first end connected to the rectilinear section and a second end connected to the conical section.

10. The rotary cutter for cutting damaged threads of the bolt as claimed in claim 2, wherein the inner periphery of the body facing the cutting space includes a first scrap discharge groove in a radial direction perpendicular to the rotating axis, wherein the first scrap discharge groove corresponds to the first cutting blade, is located on a front side of the first cutting blade, and adjoins the first cutting blade, wherein the first scrap discharge groove includes a first end intercommunicating with the cutting space and a second end extending through the body to an outer periphery of the body, and wherein an angle between the first virtual reference line and the first virtual plane and on the virtual projection plane is between 5° and 10°, and wherein the first end of the first scrap discharge groove and the rotating axis are located on a same side of the first virtual plane.

11. The rotary cutter for cutting damaged threads of the bolt as claimed in claim 10, wherein the body includes a virtual cutting plane extending perpendicularly to the rotating axis and extending through the first cutting blade, and wherein a spacing between the first cutting blade and the rotating axis and on the virtual cutting plane is smaller than a spacing between any point on the inner periphery of the body facing the cutting space and the rotating axis and on the virtual cutting plane.

12. The rotary cutter for cutting damaged threads of the bolt as claimed in claim 11, wherein the inner periphery of the body facing the cutting space includes a first evasive portion corresponding to the first cutting blade, wherein the first evasive portion is located on a rear side of the first cutting blade and adjoins the first cutting blade, wherein the first evasive portion has a first side adjacent to the first cutting blade and a second side remote from the first cutting blade, and wherein a spacing between the first evasive portion and the rotating axis and on the virtual cutting plane gradually increases from the first side of the first evasive portion toward the second side of the first evasive portion.

13. The rotary cutter for cutting damaged threads of the bolt as claimed in claim 12, wherein the first cutting blade is integrally formed with the body.

14. The rotary cutter for cutting damaged threads of the bolt as claimed in claim 13, wherein a width of the cutting space in a diametric direction perpendicular to the rotating axis gradually reduces from the operative end toward the connecting end to form a conic space.

15. The rotary cutter for cutting damaged threads of the bolt as claimed in claim 14, wherein the inner periphery of the body facing the cutting space further includes a second cutting blade, a third cutting blade, and a fourth cutting blade, wherein the second cutting blade, the third cutting blade, and the fourth cutting blade are integrally formed with the body, wherein a second virtual plane passes through the second cutting blade and extends perpendicularly to the virtual projection plane, wherein a third virtual plane passes through the third cutting blade and extends perpendicularly to the virtual projection plane, wherein a fourth virtual plane passes through the fourth cutting blade and extends perpendicularly to the virtual projection plane, wherein the virtual projection plane has a second virtual reference line, a third virtual reference line, and a fourth virtual reference line, wherein the second virtual reference line intersects the rotating axis and passes through an intersection of the second virtual plane and the virtual circle, wherein the third virtual reference line intersects the rotating axis and passes through an intersection of the third virtual plane and the virtual circle, wherein the fourth virtual reference line intersects the rotating axis and passes through an intersection of the fourth virtual plane and the virtual circle, wherein an angle between the second virtual reference line and the second virtual plane and on the virtual projection plane is between 5° and 10°, wherein an angle between the third virtual reference line and the third virtual plane and on the virtual projection plane is between 5° and 10°, wherein an angle between the fourth virtual reference line and the fourth virtual plane and on the virtual projection plane is between 5° and 10°, wherein an angle between the second cutting blade and a projection axis of the rotating axis onto the second virtual plane is between 25° and 35°, wherein an angle between the third cutting blade and a projection axis of the rotating axis onto the third virtual plane is between 25° and 35°, wherein an angle between the fourth cutting blade and a projection axis of the rotating axis onto the fourth virtual plane is between 25° and 35°, wherein the virtual cutting plane passes through the second cutting blade, the third cutting blade, and the fourth cutting blade, wherein a spacing between the second cutting blade and the rotating axis and on the virtual cutting plane is smaller than the spacing between any point on the inner periphery of the body facing the cutting space and the rotating axis, wherein a spacing between the third cutting blade and the rotating axis and on the virtual cutting plane is smaller than the spacing between any point on the inner periphery of the body facing the cutting space and the rotating axis, wherein a spacing between the fourth cutting blade and the rotating axis and on the virtual cutting plane is smaller than the spacing between any point on the inner periphery of the body facing the cutting space and the rotating axis, wherein the inner periphery of the body facing the cutting space includes a second evasive portion, a third evasive portion, and a fourth evasive portion, wherein the inner periphery of the body facing the cutting space further includes a second scrap discharge groove, a third scrap discharge groove, and a fourth scrap discharge groove, with each of the second scrap discharge groove, the third scrap discharge groove, and the fourth scrap discharge groove extending in a radial direction perpendicular to the rotating axis, wherein the second evasive portion and the second scrap discharge groove correspond to the second cutting blade, wherein the third evasive portion and the third scrap discharge groove correspond to the third cutting blade, wherein the fourth evasive portion and the fourth scrap discharge groove correspond to the fourth cutting blade, wherein the second evasive portion is located on a rear side of the second cutting blade and adjoins the second cutting blade, wherein the second evasive portion has a first side adjacent to the second cutting blade and a second side remote from the second cutting blade, wherein a spacing between the second evasive portion and the rotating axis and on the virtual cutting plane gradually increases from the first side of the second evasive portion toward the second side of the second evasive portion, wherein the third evasive portion is located on a rear side of the third cutting blade and adjoins the third cutting blade, wherein the third evasive portion has a first side adjacent to the third cutting blade and a second side remote from the third cutting blade, wherein a spacing between the third evasive portion and the rotating axis and on the virtual cutting plane gradually increases from the first side of the third evasive portion toward the second side of the third evasive portion, wherein the fourth evasive portion is located on a rear side of the fourth cutting blade and adjoins the fourth cutting blade, wherein the fourth evasive portion has a first side adjacent to the fourth cutting blade and a second side remote from the fourth cutting blade, wherein a spacing between the fourth evasive portion and the rotating axis and on the virtual cutting plane gradually increases from the first side of the fourth evasive portion toward the second side of the fourth evasive portion, wherein the second scrap discharge groove is located on a front side of the second cutting blade and adjoins the second cutting blade, wherein the second scrap discharge groove includes a first end intercommunicating with the cutting space and a second end extending through the body to the outer periphery of the body, wherein the first end of the second scrap discharge groove and the rotating axis are located on theme side of the second virtual plane, wherein the third scrap discharge groove is located on a front side of the third cutting blade and adjoins the third cutting blade, wherein the third scrap discharge groove includes a first end intercommunicating with the cutting space and a second end extending through the body to the outer periphery of the body, wherein the first end of the third scrap discharge groove and the rotating axis are located on the same side of the third virtual plane, wherein the fourth scrap discharge groove is located on a front side of the fourth cutting blade and adjoins the fourth cutting blade, wherein the fourth scrap discharge groove includes a first end intercommunicating with the cutting space and a second end extending through the body to the outer periphery of the body, and wherein the first end of the fourth scrap discharge groove and the rotating axis are located on the same side of the fourth virtual plane.

16. The rotary cutter for cutting damaged threads of the bolt as claimed in claim 15, wherein the outer periphery of the body includes a rectilinear section adjacent to the connecting end and a conical section adjacent to the operative end, wherein the conical section has a width in a diametric direction perpendicular to the rotating axis, wherein the width of the conical section gradually decreases from an end of the conical section adjacent to the operative end to another end of the conical section adjacent to the connecting end, wherein the body further includes a plurality of ribs disposed on the outer periphery of the body and extending in a radial direction perpendicular to the rotating axis, and wherein each of the plurality of ribs has a first end connected to the rectilinear section and a second end connected to the conical section.

* * * * *